United States Patent Office 3,516,323
Patented June 23, 1970

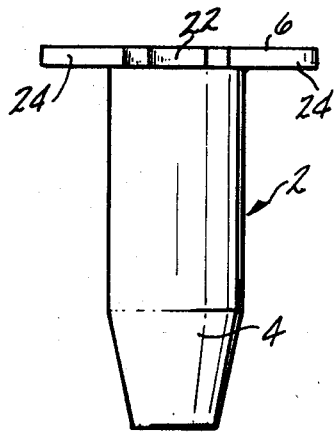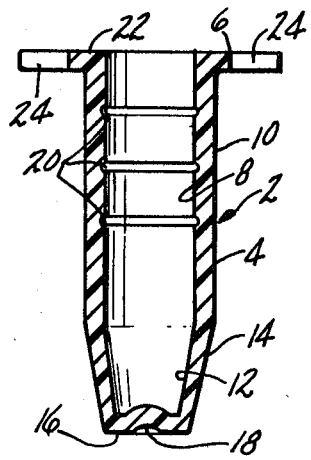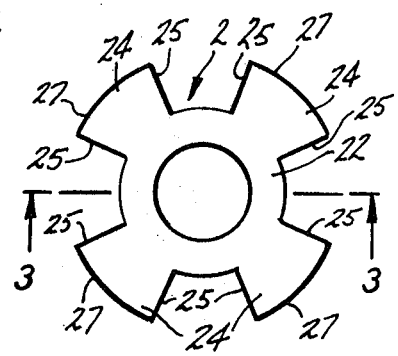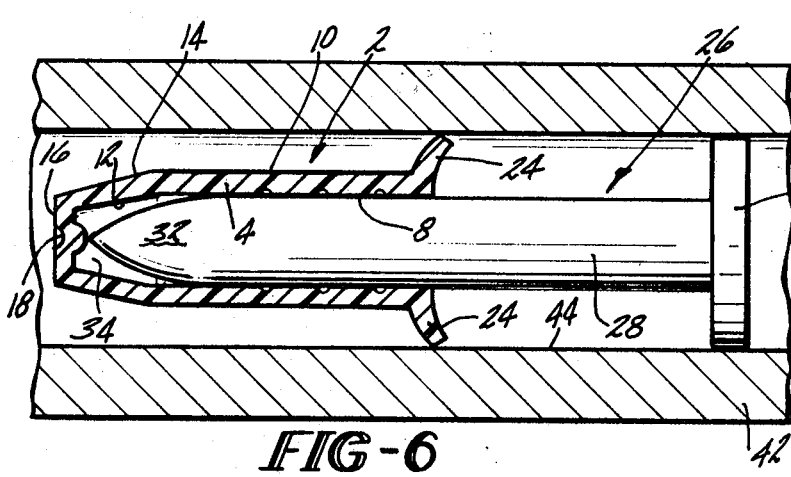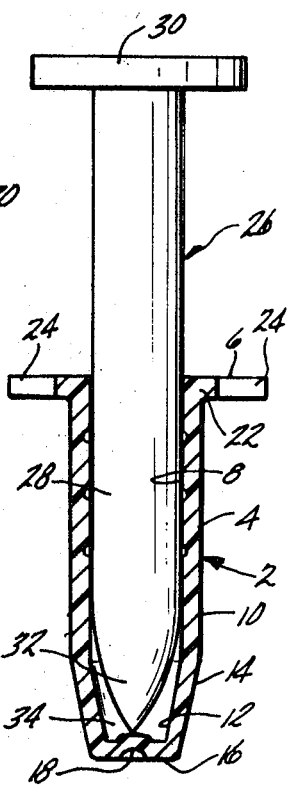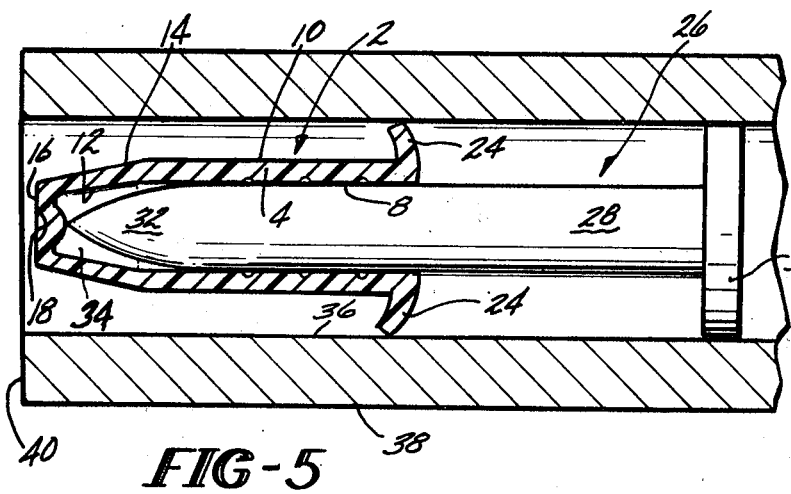

3,516,323
FASTENER AND GUIDING ATTACHMENT THEREFOR
John J. O'Brien, Hamden, Conn., assignor to Olin Mathieson Chemical Corporation, a corporation of Virginia
Filed Sept. 23, 1968, Ser. No. 761,550
Int. Cl. F16b 15/00
U.S. Cl. 85—10                                      6 Claims

ABSTRACT OF THE DISCLOSURE

The combination of a fastener and a one-piece resilient aligning attachment. The aligning attachment includes a body portion having a bore therein with one end being open and the other end closed. The attachment is mounted on the fastener with the end of the tip of the fastener being positioned adjacent the closed end and the cylindrical wall of the bore in frictional engagement with the shank portion of the fastener. The attachment includes specially designed flange means and also includes a planar forward external surface. In addition, the tip portion of the fastener is spaced from the internal wall of the attachment to provide an air space.

---

This invention relates to fasteners of the type which are fired into steel, concrete, masonry and like materials by the use of explosively actuated hand tools. More particularly, this invention relates to an improved aligning attachment for use in conjunction with such fasteners to provide a fastener assembly.

At present, one of the more common types of aligning attachments for a fastener includes a one-piece member having a generally conical-shaped body portion with a tapered socket closed at its forward end and of the size and shape corresponding to and snugly engaging the tapered front end of the fastener. The aligning member also includes an annular flange integral with and extending radially outwardly adjacent the rearward end of the body portion.

Due to particular configuration of this type of aligning member, barrels of a different bore diameter and each fastener of a different shank diameter necessitates an aligning member of a different size. In addition, it was found that the aligning member had a tendency to be ejected from the forward end of the fastener during assembly or thereafter.

In view of the above, it is an object of the present invention to provide an improved aligning attachment for use with a fastener member.

An additional object of this invention is to provide an aligning attachment for a fastener which will permit the fastener to be inserted in the barrel of a tool from either the muzzle end or the breech end.

Yet another object of this invention is to provide a guiding attachment for a fastener wherein one size can be used with barrels of different bore diameters and fasteners of different shank diameters.

Yet another object of this invention is to provide an aligning attachment for a fastener which will minimize discomfort to the hands of an operator when the fastener assembly is inserted head first into the muzzle end of a tool.

These and other objects of the invention will become more readily apparent by reference to the following description of the preferred embodiment of the invention and to the accompanying drawings in which:

FIG. 1 is a side elevation of the preferred embodiment of an aligning attachment;

FIG. 2 is a top plan view of the aligning attachment shown in FIG. 1;

FIG. 3 is a sectional view taken along the lines 3—3 of FIG. 2;

FIG. 4 is a partial sectional view of a fastener assembly showing the aligning attachment mounted on a fastener;

FIG. 5 is a partial sectional view of a portion of a barrel of an explosive-actuated tool showing the fastener assembly positioned after the assembly was inserted into the bore of the barrel from the breech end thereof; and FIG. 6 is a partial sectional view of the forward end of a barrel of an explosive-actuated tool showing the fastener assembly after it was inserted into the barrel bore from the muzzle end of the barrel.

Referring to the drawings, and specifically FIGS. 1–3, the aligning attachment indicated generally by 2 comprises a one-piece member including a body 4 having a bore therein and integral flange means 6. The side wall of the body 4 includes a cylindrical inner wall 8 extending forwardly from the rear face of the flange means 6 and a cylindrical outer wall 10 extending forwardly from the forward face of the flange means 6. The forward portion of the side wall of the body 4 includes an internal surface 12 which has a frusto-conical shape. Likewise, the outer surface 14 of the forward portion of the side wall is also tapered thereby providing a tapered forward side wall portion. It is to be noted that the forward portion of the body 4 does not come to a point, but rather, the forward end of the body 4 is provided with a forward planar surface 16 which is substantially perpendicular to the axis of the body 4. An inwardly extending dimple 18 is provided in the forward face of the body 4 and a plurality of internal grooves 20 are provided in the cylindrical inner wall 8 for purposes to be explained later.

The flange means 6 of the aligning attachment 2 comprises an annular reinforcing rim 22 extending radially outwardly adjacent the rearward end of the body 4. A plurality of spaced barrel engaging flange portions 24 extend radially outwardly from the reinforcing rim 22. According to the preferred embodiment of the invention, there are four such flange portions 24 so positioned that adjacent edges of two adjacent flange portions are spaced 45° apart. As may be seen in FIG. 2, the side edges 25 of each of the flange portions 24 are straight and the outer edges 27 are arcuate and define arcs of a common circle having a midpoint coincident with the axis of the bore of the body 4.

Preferably, the aligning attachment 2 is injection molded in one piece from a low density polyethylene material or other suitable resilient material, in a suitable mold (not shown) comprising male and female die members. The male die member which would define the internal surface of the body 4 would be provided with raised portions which form the internal grooves 20 in the cylindrical inner wall 8 to facilitate removal of the aligning attachment 2 from the mold members. The provision of the dimple 18 in the forward face of the body 4 compensates for any gate that might be formed during the molding operation so that no material extends forwardly of the forward planar surface 16.

A typical fastener member 26 with which the aligning attachment 2 may be used is shown in FIG. 4. Such fastener member may include a cylindrical shank portion 28, an enlarged head portion 30 at the rearward end of said shank portion, and a tapered tip portion 32 at the forward end thereof. The aligning attachment 2 is mounted on the fastener 26 by inserting the shank portion 28 into the bore until the tip of the fastener 26 is substantially in abutment with the forward internal surface of the body 4. The cylindrical inner wall 8 of the body 4 is of such diameter that it frictionally engages the shank 28 of the fastener 26.

As shown particularly in FIG. 4, the taper of the internal surface 12 of the forward portion of the side wall of the aligning attachment 2 is not as great as the taper of the tip portion 32 of the fastener 26 so that an air space 34 is provided between the tip 32 and the internal surface 12. The provision of this air space 34 prevents an undue amount of air compression which might cause the aligning attachment 2 to be ejected from the fastener 26 during assembly or thereafter.

In addition, the outer edges of the flange portions 24 are arcuate and are positioned radially outwardly from the axis of the fastener 26 a distance greater than the distance from the axis of the fastener 26 to the periphery of its head portion 30 so that the flange portions 24 will flex and frictionally engage the bore of the barrel of a tool.

The flange portions 24 are of sufficient resiliency such that they can flex either forwardly or rearwardly. This feature permits the insertion of the fastener assembly into the bore of a barrel in either direction. For example, as shown in FIG. 5 wherein the fastener assembly is shown after it was inserted into the bore 36 of a barrel 38 from the muzzle end 40 thereof, the head portion 30 of the fastener is in supporting engagement with the bore 36 of the barrel and the flange engaging portions 24 of the aligning attachment 2 are flexed in a forward direction in frictional engagement with the bore 36. The provision of the forward planar surface 16 provides a distinct advantage when inserting the fastener assembly into a tool head first as it prevents any discomfort to the fingers of an operator.

On the other hand, if the fastener assembly were inserted through the breech end of a barrel 42 as shown in FIG. 6, the head portion 30 of the fastener would be in engagement with the bore 44 of the barrel and the flange portions 24 flexed in a rearward direction and in frictional engagement with the bore 44.

It is to be noted that the holding power of the attachment 2 on the fastener 26 is due to the frictional engagement of the cylindrical inner wall 8 of the attachment 2 with the shank portion 28 of the fastener 26 which is imparted by the inherent resiliency of the material from which the attachment is made. This inherent resiliency also permits the attachment to stretch so that it can be inserted on shanks of different diameters. The reinforcing rim 22 tends to prevent tearing of the attachment as the fastener is inserted therein.

I claim:

1. In combination: a fastener including an elongated shank portion, a tapered tip portion at one end of said shank portion and an enlarged head portion at the other end of said shank portion; and a one-piece resilient aligning attachment including a body portion having a bore therein defined by sidewall means, one end of said bore being closed and the other end open, said sidewall means including a cylindrical sidewall extending from said open end, said attachment being mounted on said fastener with the tip portion and a portion of said shank portion being received in said bore, the end of said tip portion being positioned adjacent said closed end with at least the end of said tip portion being spaced from the sidewall means to provide an air space, said cylindrical wall being in frictional engagement with said shank portion of said fastener, and said attachment further including a circumferentially extending reinforcing rim surrounding said open end, and a plurality of flanges circumferentially spaced about said reinforcing rim and extending outwardly therefrom, the outer edges of said flange portions being spaced outwardly from the axis of said shank portion a distance greater than the distance from the axis of said shank portion to the outer periphery of said head portion.

2. In the combination of claim 1, said closed end having a planar forward external surface extending substantially perpendicular to the axis of said shank portion.

3. In the combination of claim 2, said sidewall means also having an inwardly tapering sidewall portion extending from said cylindrical sidewall to said closed end, the taper of said tapering sidewall portion being less than the taper of said tip portion to provide said air space.

4. In the combination of claim 2, each of said flange portions having straight side edges extending outwardly from said reinforcing rim and an outer arcuate edge, all of said outer edges defining arcs of a common circle having a midpoint coincident with the axis of said shaft.

5. In combination: a fastener including an elongated shank portion, a tapered tip portion at one end of said shank portion and a head portion at the other end of said shank portion; and a one-piece resilient aligning attachment including a body having a bore therein with one end closed and the other end open, said bore including a cylindrical wall portion extending from said open end, said fastener being received within said bore with the end of said tip portion being positioned adjacent said closed end and at least a portion of said cylindrical wall being in frictional engagement with at least a portion of said shank portion of said fastener, at least the end portion of the tip portion of said fastener being spaced from the internal sidewall of said bore to provide an annular air space, and flange means extending outwardly from said body portion adjacent the open end thereof.

6. In the combination of claim 5, said closed end having a forward planar external surface extending substantially perpendicular to the axis of said shank.

References Cited

UNITED STATES PATENTS

| 3,395,604 | 8/1968 | Williams | 85—82 |
| 2,968,984 | 1/1961 | De Caro | 85—10 |
| 3,377,903 | 4/1968 | Korte | 85—10 |
| 3,385,157 | 5/1968 | Rapata | 85—72 |
| 3,395,604 | 8/1968 | Williams | 85—82 |

RAMON S. BRITTS, Primary Examiner

U.S. Cl. X.R.

102—93